3,136,761
METHOD FOR OBTAINING SAPOGENINS AND USEFUL BY-PRODUCTS FROM PLANT MATERIALS
Bjarte Löken, Shrewsbury, Mass., assignor, by direct and mesne assignments, to Phytogen Products, Inc., Santurce, Puerto Rico, a corporation of Delaware
No Drawing. Filed June 7, 1962, Ser. No. 200,629
7 Claims. (Cl. 260—239.55)

The present invention relates to the production of steroidal sapogenins from saponin containing plant material through acidic hydrolysis of the whole plant or portions like the tubers, or leaf pulp and has for its object the provision of an improved acid hydrolysis procedure.

The present invention can be understood by consideration first of the many and diverse plant materials which are known to contain saponins, including particularly plants of the order of Liliflorae in the families Liliaceae, Amerillidaceae and Dioscoreaceae. Specific plants which can be treated according to the present invention are: yuccas, agaves, dioscoreas, sarsaparillas, trilliums, henequen and sisals. The water soluble steroidal glycocides or saponins native to the plants may be found concentrated variously in the roots, stalks, seeds leaves, flowers, or fruits. Also present, however, are such typical plant materials as pigments, oils, waxes, sugars, starches, cellulose, etc.

One procedure that has been suggested to recover steroidal sapogenins directly from such plant material is a hydrolysis treatment of the finely divided plant material with a strong nonoxidizing acid, e.g. heating ground dioscorea roots in 2-N-hydrochloric acid. This acid hydrolysis procedure proved to be difficult and expensive on a commercial scale and the attention of workers in the art has largely turned toward other recovery techniques like enzymatic hydrolysis, and preliminary extraction of the saponin followed by hydrolysis. Since the alternative procedures are also beset with problems and disadvantages, direct acid hydrolysis of saponin containing plant material has been reinvestigated.

A basic problem in strong acid direct hydrolysis procedures for the conversion of saponins to sapogenins resides in the concurrent conversion of plant materials into water insoluble tars, color bodies and resinous impurities. Subsequent recovery of a pure sapogenin from the hydrolysis is complicated by presence of these co-products, necessitating an extensive and expensive recovery and purification system. Ideally, therefore, the acid hydrolysis treatment should act to solubilize all of the plant material, save possibly cellulose while simultaneously, insolubilizing the saponin content by conversion to the sapogenin derivative thereof. Restated in the above terms, the hydrolysis treatment is as much a pulping treatment on a cellulose stock of sorts. In keeping with this concept it has now been discovered that modified pulping procedures can be employed. Advantageously, they are consistent with the treatment conditions for hydrolysis of saponins to the sapogenins.

Specifically, it has now been discovered that effecting the hydrolysis of saponin containing plant materials with sodium calcium or magnesium acid sulfite, results ultimately in the facile recovery of a high yield of sapogenin.

The improved results obtained appear directly attributable to characteristic features of hydrolysis with bisulfite or acid sulfite. The saponin content is, of course, hydrolized to form the corresponding sapogenin and sugar, the sapogenin being obtained in high yield. Apparently the strong acids suggested by the prior art not only hydrolyze or decompose the sugar moiety of the saponin molecule, but attack the steroid moiety. In most experiments higher yields of sapogenin have been obtained according to the procedure of the present invention than the plant material assayed. (The asay method is based upon direct hydrolysis with aqueous hydrochloric acid.) In addition, with biuslfite hydrolysis, the starch and other carbohydrates content of the plant material is hydrolyzed to form sugars; moreover, the sugar content in the hydrolyzate is not caramalized or otherwise decomposed, particularly when hydrolysis is effected in the preferred pH range of 0.75-1.25.

One of the most important features of the present invention is that bisulfite hydrolysis causes various unidentified substances, characterized in the prior art as the bothersome tars, to stay in aqueous solution. It is believed that these materials form soluble complexes similar to the ligno sulphonates present in the waste sulfite liquor which result from wood digestion by the sulfite process. Be that as it may, the water solubilization of these impurities leaves behind a solid hydlolzate product of a saponin containing plant material which has been found to consist chiefly of cellulose and the free sapogenin. A principal advantage of the present invention appears when the sapogenin is extracted from the solid hydrolyzate product by a solvent, the cellulose remaining behind acts as an excellent filter aid and a clear solvent solution is easily obtained.

Quite important to the commercial practice of the present invention is the advantageous circumstance that procurement or preparation of the bisulfite is simple, and inexpensive. Its preparation is conductive to primitive field operations in remote rural communities. Calcium acid sulfite can be generated on the spot by charging a tower with limestone, then sprinkling water in at the tower top while passing sulfur dioxide in at the tower bottom to form a counter-current system. Depending on the temperature the saturated calcium acid sulfite, i.e.

$$Ca(HSO_3)_2$$

contains about 6.3% $SO_2$ and has a pH of about 1.02. Limestone is available locally almost everywhere and it does not make any difference if dolomite is used since pure magensium acid sulfite performs just as well as the calcium acid sulfite and a mixed calcium, magnesium acid sulfite can be employed for the hydrolysis without detriment. The sulfur dioxide would ordinarily be obtained by direct combustion of sulfur, although conceivably pyrite roasting or direct purchases of sulfur dioxide might be more feasible in some areas. All the chemicals involved are of such low cost that wood digester acid, as is may be called, generated on the spot is generally the lowest cost acid available.

In keeping with primitive operations hydrolysis employing wood digester acid can be carried out in simple inexpensive reactors, suitably of mild steel construction. Direct injection of steam can be employed for heating purposes although, of course, more sophisticated equipment, such as steam jacketed kettles may prove ad- advantageous.

According to the detailed practice of the present invention, saponin bearing plant materials as previously described, but preferably selected from the group consisting of agave, yucca, dioscorea and related genera, is contacted for several hours, e.g. 5 hours with over 100% by weight thereof of an aqueous bisulfite of a metal selected from the group consisting of sodium, calcium, magnesium and mixtures thereof, the acid sulfite being at a pH in the range of about 0.5 to 2.0 and preferably 0.75–1.25, the hydrolysis being effected under autoclaving conditions and at temperatures in the range of 100° C. to 150° C. Subsequently, the reaction mixture is cooled, filtered and the filter cake washed with water. Thereafter the sapogenin may be extracted from the filter cake, preferably by a hydrocarbon solvent and recovered by conventional techniques.

The liquor recovered from hydrolysis effected according to practice of the present invention need not be discarded. Products which can be obtained therefrom are particularly valuable in the often remote rural regions (of the tropics) which are the sources of most saponin containing plant materials. The sugars present in the hydrolyzate liquor can be fermented through the use of saccharomyces yeast or turula yeast, yeasts which constitute an excellent cattle food high in proteins and such nutritional components as the B vitamins ranging from $B_1$ to $B_{12}$. Indeed many of the plants which can be profitably worked up for their saponin content grow in arid regions of the tropical zone areas, where a great demand exists for locally available livestock feed.

In order to recover the yeast and alcohol by-products the aqueous filtered liquor is first neutralized with slaked lime, powdered dolomite, powdered limestone, ammonia, sodium hydroxide, or whichever alkaline material happens to be the most readily available, and is then inoculated with a saccharomyces strain of yeast and (for nutrient purposes) some ammonium phosphate. During the initial phases of fermentation air is passed into the (wooden) fermentation vat through the bottom. Later the air is turned off and fermentation can be determined by analysis of the sugar content remaining in the broth, the fermentation being completed ordinarily, in about two days. Thereafter, the broth is centrifuged to collect the solid yeast product. The collected yeast is water washed, flaked and dried. The alcohol content is distilled from the filtrate and further rectified to desired concentration. This liquor treating system is similar to the commercial procedure employed for recovering alcohol from the sulfite waste liquor as practiced in Norway, Sweden and Finland. However, in the present instance a much higher sugar content is in the starting liquor because the plant material (exemplarily tubers from dioscoreaceae or leaved from agave and cacti) contain substantial quantities of starches and carbohydrates. Thus the vats and distillation equipment for a given production of alcohol from hydrolyzate are on a smaller scale than in the waste sulfite industry, permitting even a primitive operation with relatively inefficient equipment such as cast iron rum stills to be economic.

By blowing air in throughout the fermentation, more yeast is obtained, but no alcohol. Under primitive field conditions it is simpler to produce yeast without an alcohol co-product. For yeast alone inoculation with a torula strain is sometimes an advantage because torula can multiply equally well on hexose sugars and pentose sugars, an advantage when a considerable amount of pentoses are present.

In passing it is important to note that sodium bisulfite may be used instead of calcium or magnesium bisulfite only for installations wherein no recovery of by-products from the hydrolyzate liquor is contemplated. The resulting presence of so much sodium salts in the hydrolyzate inhibits the subsequent fermentation procedure and use of sodium bisulfite is, therefore, far less desirable than calcium or magnesium bisulfite for practice of the present invention in all of its ramifications. The sodium bisulfite may be generated by adding sulfur dioxide to aqueous sodium carbonate, suitably in a counter current tower system with coke filling the tower.

For a better understanding of the present invention, the following specific examples are presented for exemplary purposes. They are not to be construed as limiting the invention to the materials described, nor to exclude obvious secondary modification which do not alter the desired results.

EXAMPLE I 296 g. of fresh tubers of *Dioscorea fluoribunda* were cut in pieces and ground in a Waring Blendor with 760 ml. of wood digester acid, a solution of $Ca(HSO_3)_2$ assaying:

| | |
|---|---|
| $Ca^{++}$ as CaO _____ percent __ | 2.7 |
| $(HSO_3)^-$ as $SO_2$ _____ do ____ | 6.3 |
| pH _____ | 1.05 |

This mixture was charged into a sealed steel autoclave and maintained at a bath temperature of 130–136° C. for 5 hrs. Thereafter the autoclave was cooled, and the solid hydrolyzate collected on a filter and washed with 1 liter of water. An aliquot of the combined filtrate was used for a sugar determination according to Bertrand, and for fermentation experiments. The solid hydrolyzate was dried overnight at 60° C. and exhaustively extracted with a petroleum fraction (naphtha) in a Soxhlet.

The clear slightly yellowish extract was concentrated to approximately 250 or 300 ml. Upon standing at room temperature (+22° C.) diosgenin crystallized out. After filtration and washing with a little petroleum ether there resulted 3.5 g. of diosgenin, M.P. 199–204° C.; $[\alpha]_D$ –124° (chloroform). Infrared spectrum showed its identity with an authentic specimen of diosgenin. Further concentration of the mother liquors gave an addition 0.2 g. of diosgenin, M.P. 197–204°, to bring the total yield to 3.7 g. diosgenin. The yield amount to 1.25% from fresh root, 5.0% from dry tubers since the tubers employed had 75% moisture.

Inoculation of a sample of the hydrolysis filtrate (after neutralization to pH 5 by addition of calcium carbonate) with saccaromyces (bakers yeast), and ammonium phosphate followed by fermentation for 3 days, gave on distillation an alcohol yield (95% strength) corresponding to 31 ml. for the total tuber input. Some yeast also was collected. A sugar determination of the hydrolyzate filtrate indicated 16.9% sugars on a fresh root basis.

The assay determination following hydrochloric acid hydrolysis resulted in some decomposition of the sugars as well as of steroid. With another sample from the identical batch of Dioscorea the following assay results were obtained:

| | |
|---|---|
| Diosgenin _____ | 1.17% fresh basis or 4.68% dry basis. |
| Moisture _____ | 75.0%. |
| Sugars in hydrolysis liquors acc. Bertrand _____ | 10.7% fresh basis. |

After neutralization with calcium carbonate (lime and sodium carbonate were also tried) and proper inoculation with bakers yeast and ammonium phosphate, no fermentation occurred, apparently because of too high a salt concentration.

EXAMPLE II

*Dioscorea deltoidea* tubers (from India) was found to contain less moisture than the Dioscoreaceae of Mexico and Central America. The roots which were very hard were ground on a guarn after cutting into pieces. The moisture content of the powder so obtained was found to be 51% (18 hrs. at 105°).

204 g. of the powdered tubers of *D. deltoidea* were charged into a 204 stainless steel autoclave with 600 ml. of wood digester acid. Some additional sulfur dioxide was added from a cylinder, lowering the pH to 0.09.

This mixture was heated at a bath temperature of 120° C. for a period of 5 hrs. Work-up as in Example I gave this input (effectively of 100 g. dry solids):

Diosgenin _____ 4.02% on dry basis.
Sugars _____ 28.6% on dry basis.
95% alcohol obtained _____ 17.4 ml.

Yeast, when no alcohol was produced:
 Saccharomyces _____ 21. g. dry.
 Protein _____ 38% (N. 6.25).
 Torula _____ 23 g. dry.

Assay: Method see below:
 Diosgenin _____ 3.6% on dry basis.
 Sugars _____ 18.6% on dry basis.

No alcohol or yeast could be obtained after attempts to inoculate the neutralized assay hydrolysis filtrate with bakers yeast or torula.

EXAMPLE III 204 g. of the powdered tubers of *Dioscorea deltoidea* were hydrolyzed as described in Example II with the only difference that no addition sulfur dioxide was added to the autoclave, pH was 1.0 and the bath temperature was 135°. Essentially the same results as those described in Example II above were obtained.

EXAMPLE IV 204 g. of the powdered tubers of *Dioscorea deltoidea* were hydrolyzed as described in Example II with in this instance the pH being adjusted to 0.8 by addition of dilute sulfuric acid. This tends to increase the dissociation of the ionic complex by formation of calcium sulfate which precipitates out of solution. The mixture was autoclaved at a bath temperature of 118–120° for 5 hrs. On basis of the dry root, 4.1% Diosgenin M.P. 201–204° was obtained. With regard to other product yields the results were essentially identical with the recoveries reported in Example II (i.e. within the experimental limits).

EXAMPLE V

A sample of pulp obtained by retting the fibres from approximately 1 kg. of leaves from *Agave furcroyides* (hennequen) from the state of Tamaulipas in Mexico weighed 1.8 kg. How much water was added during the retting process was not exactly known, nor how much fibres were obtained. To this material was added 1.8 liters of wood digester acid and the pH adjusted to 0.9 by adding some cylinder sulfur dioxide. The mixture was autoclaved at 130° bath temperature for 5 hrs. Cooling, filtering, washing with 1.8 liters of water and drying provided 35 g. of hydrolyzate from which 9 g. of crude hecogenin was obtained by toluene extraction and appropriate concentration of the extract to a final volume of 40 ml. The hecogenin exhibited the following constants: M.P. 249–252°, $[\alpha]_D +15°$ (chloroform).

After neutralization as described in Example I, inoculation of an aliquot with bakers yeast gave an alcohol yield which (prorated to the one kilogram fresh basis for the hennequen leaves) was 41 ml. 95% alcohol.

The yield of dry torula yeast was 42 g. No conventional assay determination was run on this sample, but the hecogenin yield appears to be some 10–20% above that which is generally reported for hennequen pulp.

Assay Method 50 g. fresh barbasco tubers (or other saponin containing plant material) with a known moisture content was cut in pieces and disintegrated in a Waring Blendor (when the material is very hard a guarn is better used) with 100 ml. of water. The mixture was transferred to a flask and refluxed for 5 hrs. with an additional 100 ml. hydrochloric acid made by mixing 50 ml. of concentrated hydrochloric acid with 50 ml. of water. The solids were filtered, washed with water to a total of 500 ml. providing a suitable aliquot for sugar determination according to Bertrand.

The solid hydrolyzate was dried overnight at 60° C. and exhaustively extracted with petroleum naphtha in a Soxhlet. Concentrating this extract to approximately 25 ml. gives the first crop of sapogenin and further concentration gives another crop of acceptable material. This method gives the total sapogenin content. In case more than one sapogenin is present in the starting material, these will have to be separated (e.g. by chromatography). When only one is present, the sapogenin obtained is identifiable by its physical constants as well as infrared comparison with the spectra of an authentic specimen.

Numerous variations from the specific details described above may be employed without departing either from the spirit of the present invention or the scope of the appended claims.

What is claimed is:

1. A process for obtaining the sapogenin content from saponin bearing plant material of a family of the group consisting of Liliaceae, Amerillidacea and Dioscoreaceae which comprises subjecting such plant material in a finely divided state to hydrolysis in the presence of aqueous bisulfite of a metal selected from the group consisting of sodium, magnesium, calcium and mixtures thereof, thereafter separating the insoluble material from the aqueous portion of the hydrolyzate and extracting the sapogenin from the insoluble material with an organic solvent.

2. The process of claim 1 wherein the pH is in the range of from 0.75–1.25.

3. The process of claim 1 wherein the hydrolysis is effected under autoclaving conditions at temperatures ranging from 100–150° C.

4. A process for obtaining sapogenin and other products from saponin bearing plant materials from a family of the group consisting of Liliaceae, Amerillidaciae and Dioscoreaceae, which comprises subjecting such plant material in a finely divided state to hydrolysis in the presence of aqueous bisulfite of a metal selected from the group consisting of calcium and magnesium and mixtures thereof, thereafter separating the insoluble material from the aqueous portion of the hydrolyzate, said insoluble material including the sapogenin content of the hydrolyzate and thereafter fermenting the aqueous portion of the hydrolyzate to yield yeast and alcohol products.

5. The process of claim 4 wherein the fermentation is effected aerobically with torula yeast to yield only a yeast product.

6. A process for obtaining hecogenin from the leaf pulp of agave plants which comprises subjecting the leaf pulp to acid hydrolysis in the presence of aqueous calcium bisulfite of a pH in the range of 0.75–1.25, thereafter separating the insoluble material from the aqueous portion of the resulting hydrolyzate and extracting the hecogenin from the insoluble material with an organic solvent.

7. A process for obtaining diosgenin from tubers of dioscoreaceae plants which comprises subjecting ground tubers to acid hydrolysis in the presence of aqueous calcium bisulfite of a pH in the range of 0.75–1.25, thereafter separating the insoluble material from the aqueous portion of the resulting hydrolyzate and extracting the diosgenin from the insoluble material with an organic solvent.

References Cited in the file of this patent

FOREIGN PATENTS 799,047  Great Britain _____ July 30, 1958